United States Patent Office 3,199,887
Patented Aug. 10, 1965

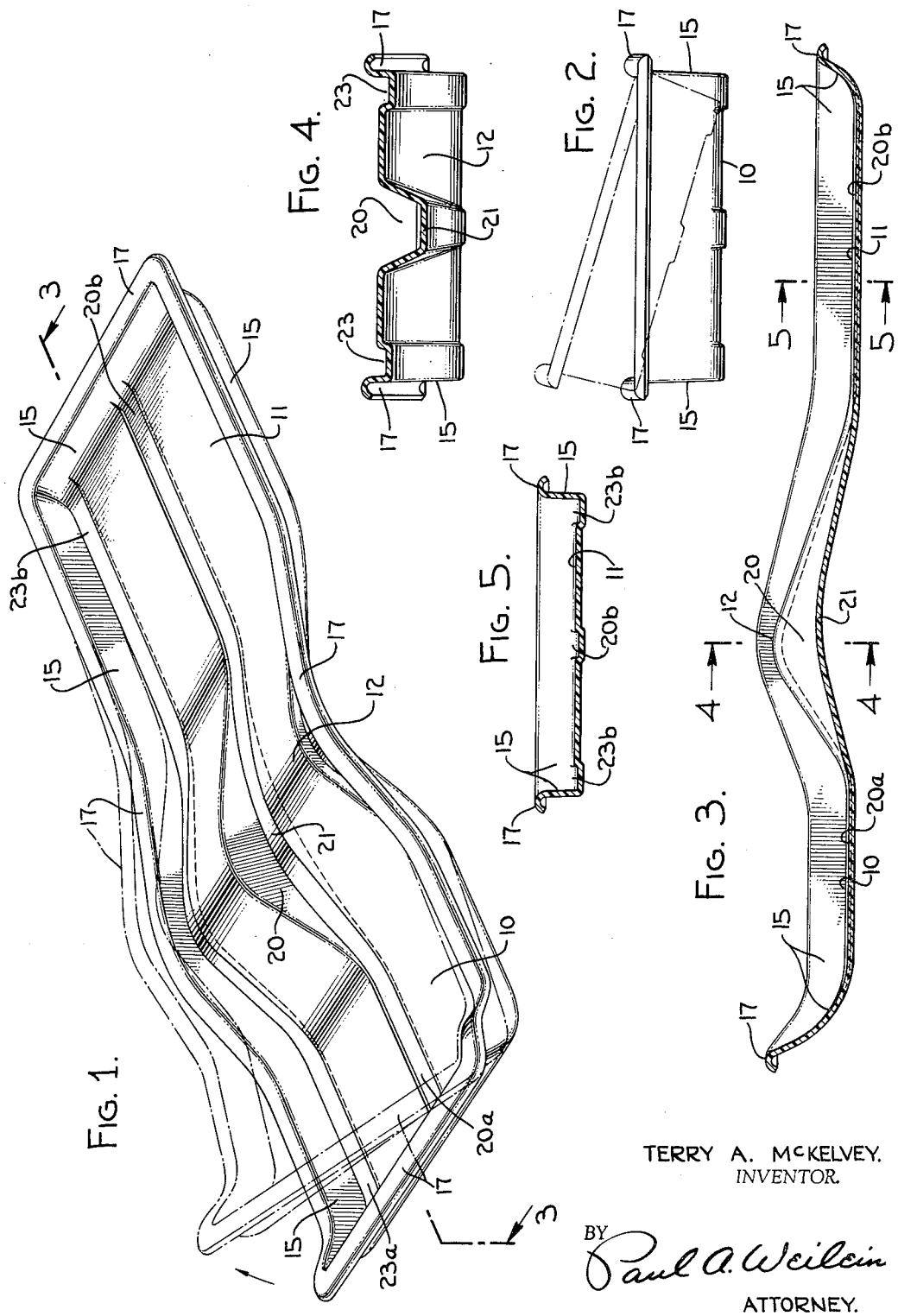

3,199,887
SLED
Terry A. McKelvey, 4516 Daleridge, La Canada, Calif.
Filed Mar. 18, 1963, Ser. No. 265,627
5 Claims. (Cl. 280—18)

The present invention relates to sleds and particularly to sleds of the toboggan type that are lightweight, simple in construction and adapted to safe use by unskilled persons.

It is a general object of the present invention to provide a sled of this character which is novel in construction and design so that it is of minimum weight while still having sufficient strength for safe use.

It is also an object of this invention to provide a sled of the character described that is so constructed that sleds may be nested when stacked one on top of another in order to facilitate shipment and storage of a number of the sleds.

It is another object of the present invention to provide a sled of the character described that has a substantially continuous bottom surface in order to eliminate or at least minimize the danger of the sled becoming snagged on rocks, twigs, or other objects buried in the snow and to provide a high degree of safety for the rider against being struck by such objects. A further advantage of the closed bottom construction is that there is no opening therein or projecting surface provided by the sled which admits or scoops up snow during forward movement of the sled.

It is a further object of the present invention to provide a sled of substantially unitary construction in which all the portions of the sled are integral with each other, thus eliminating the need for separate fastening members and contributing to increased strength of the sled with increased safety and durability of the article.

Still a further object of the present invention is the provision of a sled of the character described in which the body of the sled has sufficient flexibility that the sled may be steered by pulling up on one side of the sled and pushing down on the other, thus tilting an advancing portion of the sled with respect to the surface over which it is moving to steer the sled to the right or left as may be desired.

These and other objects of the present invention have been achieved in a sled of the toboggan type embodying the present invention by forming the sled from a single, substantially continuous piece of sheet material. The sled is provided with two spaced front and rear ground engaging sections, preferably having substantially flat bottom surfaces, and an upwardly arched intermediate section integral with and joining the front and rear sections. Hand grip means are provided at the sides of the intermediate section. This may conveniently be provided in the form of a marginal flange which provides a good grip. In order to stiffen the sled it is preferable that the marginal portions of the sheet be turned upwardly into a wall extending continuously around the entire perimeter of the sled, and it is preferred to place the flange at the top of this wall, the flange in a preferred embodiment extending continuously around the perimeter of the sled.

How the above objects and advantages of the present invention are achieved, as well as others not specifically mentioned herein, will be better understood by reference to the following description and to the annexed drawing, in which:

FIG. 1 is a front perspective of a toboggan sled constructed according to the present invention, the flexed position of the sled for steering to the left being shown in broken lines;

FIG. 2 is a front elevation of the sled, the flexed position again being shown in broken lines;

FIG. 3 is a longitudinal median section on line 3—3 of FIG. 1;

FIG. 4 is a transverse vertical section on line 4—4 of FIG. 3; and

FIG. 5 is a transverse vertical section on line 5—5 of FIG. 3.

Referring to the drawing, and particularly to FIG. 1, the sled shown therein is a toboggan type sled of one-piece, unitary construction. The sled is economically made by molding a single sheet of material into the shape shown. This sheet is preferably of uniform thickness, or substantially so, to start with, but it will be realized that in the final product the sheet may become thinner or thicker at various locations as the material is drawn out or compressed in the process of molding or otherwise shaping the sheet into the configuration desired. For this purpose there are various resins or plastics that are suitable materials, one of the thermoplastic type being preferable as making possible economical methods of manufacture.

The sled as shown in the accompanying drawing comprises three principal sections. It has spaced front and rear ground engaging sections 10 and 11 respectively, which are integral with and joined by an upwardly arched intermediate section 12. The front and rear ground engaging sections 10 and 11 preferably have substantially flat bottom surfaces in order to slide over the snow with minimum friction. It is preferable to minimize any downwardly projecting ribs or other projections on these ground engaging sections as such projections tend to resist lateral movement of the sled and thus interfere to some degree with the ability of the user to steer the sled.

The arched or intermediate section not only joins together the two ground engaging sections of the sled in such a way that the latter are maintained in properly spaced and aligned relationship, but the arched nature of the intermediate section stiffens the entire sled structure and also reduces the area of the sled in ground contact, thus reducing the amount of friction between the sled and the surface over which it moves. Front and rear sections 10 and 11 respectively are spaced apart at such a distance that the user of the sled may sit on the rear section 11 with the legs bent at the knee and spanning the intermediate section 12 while resting his feet upon front section 10.

An upstanding side wall 15 is formed integrally with the sections 10, 11 and 12 of the sled. Side wall 15 preferably extends entirely around the perimeter of the sled, thus being disposed at three sides of each of the front and rear sections and at the two opposite sides of the intermediate section. This side wall is not necessarily of uniform height or inclination. As shown in FIG. 3, the side wall is made somewhat higher and more rounded at the front end of the sled than at other portions, particularly at the center of arched section 12 where the side wall 15 is of minimum height. This side wall stiffens the entire sled, and particularly the two ground engaging sections, thus permitting the sections to be thinner than would be otherwise practical. The side wall also provides a protective railing which guards the user against striking against external objects and sliding off of the sled when turning a corner, or the like.

Further stiffening of the sled, and more especially the side wall, is obtained by flange 17 which extends outwardly from the upper edge of side wall 15 and preferably also extends entirely around the sled. Flange 17 may have any desired configuration in cross section, but is preferably rolled or arcuate when viewed in section as shown in FIGS. 3 and 4.

One advantage of this shape of the flange is that where the flange passes over the center of intermediate section 12, the flange forms hand grip means at the opposite sides of the intermediate section. The user may grasp the hand grip means in each hand and can effect steering of the sled by a torsional flexing of the sled about its longitudinal axis through forces applied to the sled body by the hand grip means.

For example, by pressing down with the left hand and lifting up with the right hand the front right corner of the sled can be raised as shown in broken lines in FIG. 1, thus tilting the ground engaging section 10 downwardly to the left. This develops a lateral thrust against the sled as it moves over the surface of the snow, causing the sled to curve to the left. Obviously, the sled may be steered to the right in the same manner by pressing downwardly on the hand grip means with the right hand and lifting upwardly with the left hand. Some assistance may also be obtained in steering the sled by pressing down with one foot on the bottom of the forward ground engaging section, foot pressure being applied at the side of the sled toward which it is desired to turn.

Central section 12 may be provided with stiffening means in the form of at least one depressed area that is relatively narrow and elongated from front to rear, extending substantially between the two ground engaging sections 10 and 11. Such a depressed area is shown at 20 in FIGS. 1 and 4. This depressed area takes the form of an inverted rib, but it will be noted that the bottom wall 21 is also arched upwardly out of engagement with the ground between the front and rear sections 10 and 11.

If desired, additional strength or stiffness in the arched intermediate portion can be obtained by a longitudinally extending depressed area 23 at each side of the sled, as shown in FIG. 4 particularly. These side depressed areas resemble the central one 20 except that they are not as deep. The bottom walls here are arched higher than is wall 21. The bottom walls of all the depressed areas feather out at the front and rear ends into shallow depressions 20a and 23a in the front and 20b and 23b in the rear ground engaging sections.

Although not necessary from the standpoint of structural strength, it is preferred that the intermediate section 12 of the sled present a substantially continuous surface on the underside, that is that it be free of openings, at least of any size. The upwardly sloping rear face of the intermediate section combined with its freedom from openings, insures that the sled will ride up over rather than catch on any twigs, rocks, or other objects buried in the snow. This construction also eliminates scraping up any snow which is then piled into the sled and in the lap of the user. The arch of the intermediate section causes the user to sit well back in the proper position and also resists to some extent a tendency to slide forward off the sled when stopping suddenly. These features make for comfort and safety in use.

An advantage of the one-piece unitary construction is that all the component parts of the sled are integral with one another and there is no need to provide any metal fastenings or the like which pass through holes or openings in the sled. Bolt holes cause stress concentrations at the holes and this in turn often leads to tearing of sheets under severe loading. Failure in this respect is avoided by the unitary construction of the present invention.

While specific structural details have been shown and described, it should be understood that changes and alterations may be resorted to without departing from the spirit of the invention as defined in the appended claims.

I claim:

1. In a one-piece sled of the toboggan type, the combination comprising: spaced front and rear ground engaging sections; an upwardly arched intermediate section integral with the front and rear sections; said intermediate section having a central, longitudinally extending depression of which the bottom wall is also arched upwardly but to a lesser extent than the intermediate section at either side of the central depression; and hand grip means at the sides of the intermediate section.

2. In a one-piece sled of the toboggan type, the combination comprises: spaced, substantially flat front and rear bottom sections; an upwardly arched intermediate section integral with the front and rear sections; said intermediate section having at least one depressed area extending substantially between the front and rear bottom sections and stiffening the intermediate section; and hand grip means at the sides of the intermediate section.

3. A sled of the toboggan type comprising: a single, substantially continuous piece of material having two spaced ground engaging areas, an upwardly arched section integral with and interconnecting said ground engaging areas, said arched section having at least one relatively depressed area extending between the ground engaging areas and stiffening the arched section, and marginal portions of the piece turned up at the sides of the sled to stiffen the ground engaging areas and to provide hand grip means at the sides of the arched section.

4. A sled as claimed in claim 3 in which the turned-up marginal portions are shaped to provide an upstanding wall entirely around the sled and a continuous rolled flange at the top of the upstanding wall, said flange providing the hand grip means.

5. A sled as claimed in claim 3 in which the sled comprises a single sheet of a thermoplastic synthetic resin of substantially uniform thickness.

References Cited by the Examiner

UNITED STATES PATENTS

| 2,424,694 | 7/47 | Jones | 280—19 |
| 2,829,902 | 4/58 | Stocker | 280—18 |
| 2,937,032 | 5/60 | McKelvey | 280—18 X |

ARTHUR L. LA POINT, *Primary Examiner.*

A. HARRY LEVY, *Examiner.*